United States Patent [19]
Bell et al.

[11] 3,876,243
[45] Apr. 8, 1975

[54] ENERGY ABSORBING BUMPERS FOR VEHICLES

[75] Inventors: Gordon Bell, Berkswell; Arthur Edwin Ballard, Coventry, both of England

[73] Assignee: British Leyland uk Limited, London, England

[22] Filed: June 4, 1973

[21] Appl. No.: 366,568

[30] Foreign Application Priority Data
June 29, 1972 United Kingdom............... 30374/72

[52] U.S. Cl. .............................. 293/71 P; 114/219
[51] Int. Cl. ............................................. B60r 19/08
[58] Field of Search .......... 114/219; 293/62, 64, 65, 293/71 R, 71 P, 88, 98

[56] References Cited
UNITED STATES PATENTS

| | | | |
|---|---|---|---|
| 2,080,989 | 5/1937 | Smith................................. | 293/71 R |
| 2,188,082 | 1/1940 | Imhofe.............................. | 293/71 R |
| 2,910,033 | 10/1959 | Weisburg....................... | 293/71 R X |
| 3,335,689 | 8/1967 | Hein.................................... | 293/71 R |
| 3,493,257 | 2/1970 | Fitzgerald et al. ................ | 293/71 R |
| 3,606,434 | 9/1971 | Barton et al. .................... | 293/71 R X |
| 3,638,985 | 2/1972 | Barton et al. .................... | 114/219 X |
| 3,768,850 | 10/1973 | Barton et al. ..................... | 293/71 R |

FOREIGN PATENTS OR APPLICATIONS

| | | | |
|---|---|---|---|
| 1,035,216 | 8/1953 | France .............................. | 293/71 R |
| 69,003 | 8/1958 | France .............................. | 293/71 R |

Primary Examiner—M. Henson Wood, Jr.
Assistant Examiner—Andres Kasknikow
Attorney, Agent, or Firm—Brisebois & Kruger

[57] ABSTRACT

An energy absorbing bumper comprises a rigid structural member and an outwardly directed elastomeric member. The elastomeric member has a concave interior surface from which deformable webs extend to contact with, or lie closely adjacent to, the structural member. Deformation of the elastomeric member absorbs substantial amounts of energy and return of the member to the original shape when the cause of deformation is removed.

3 Claims, 5 Drawing Figures

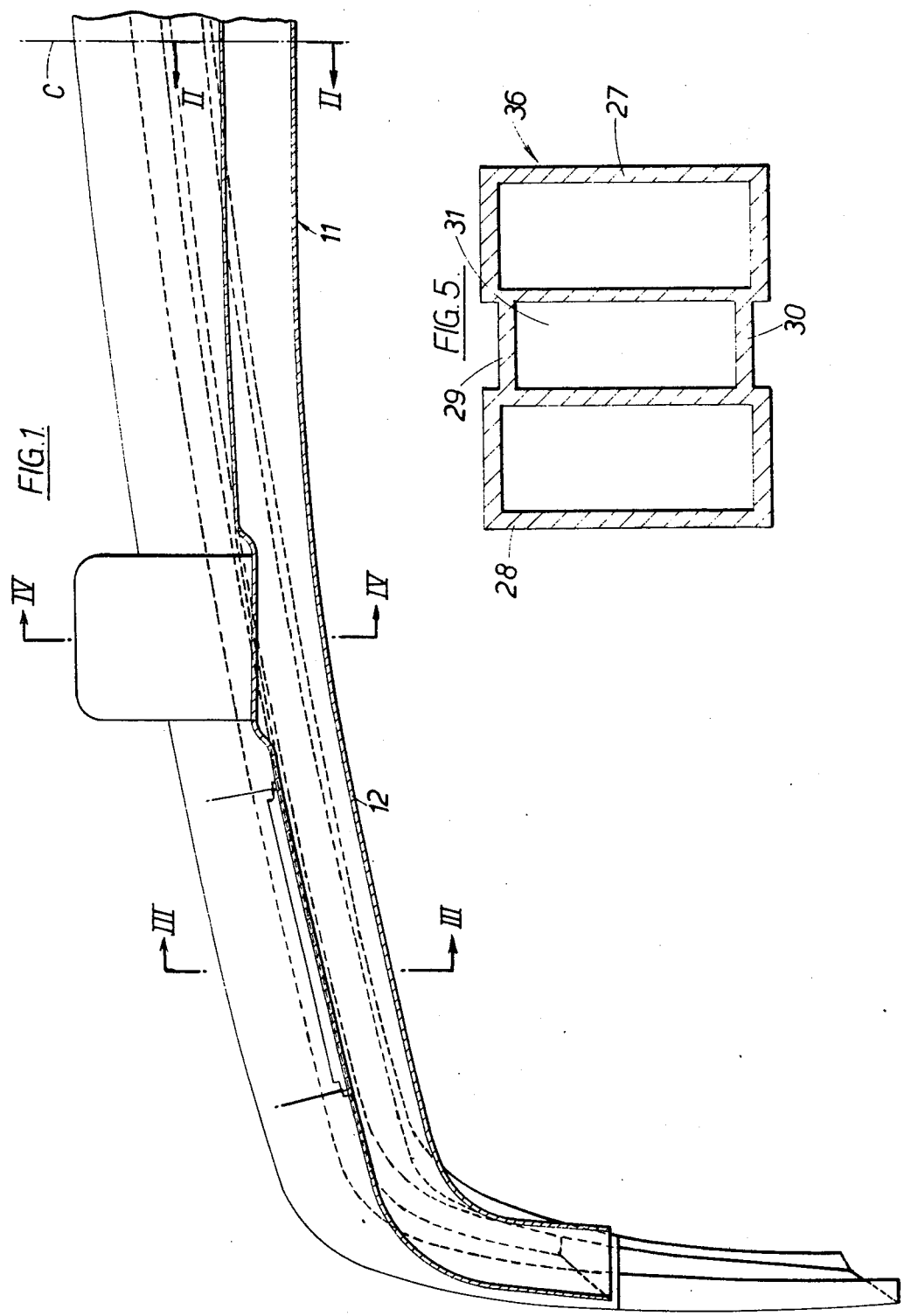

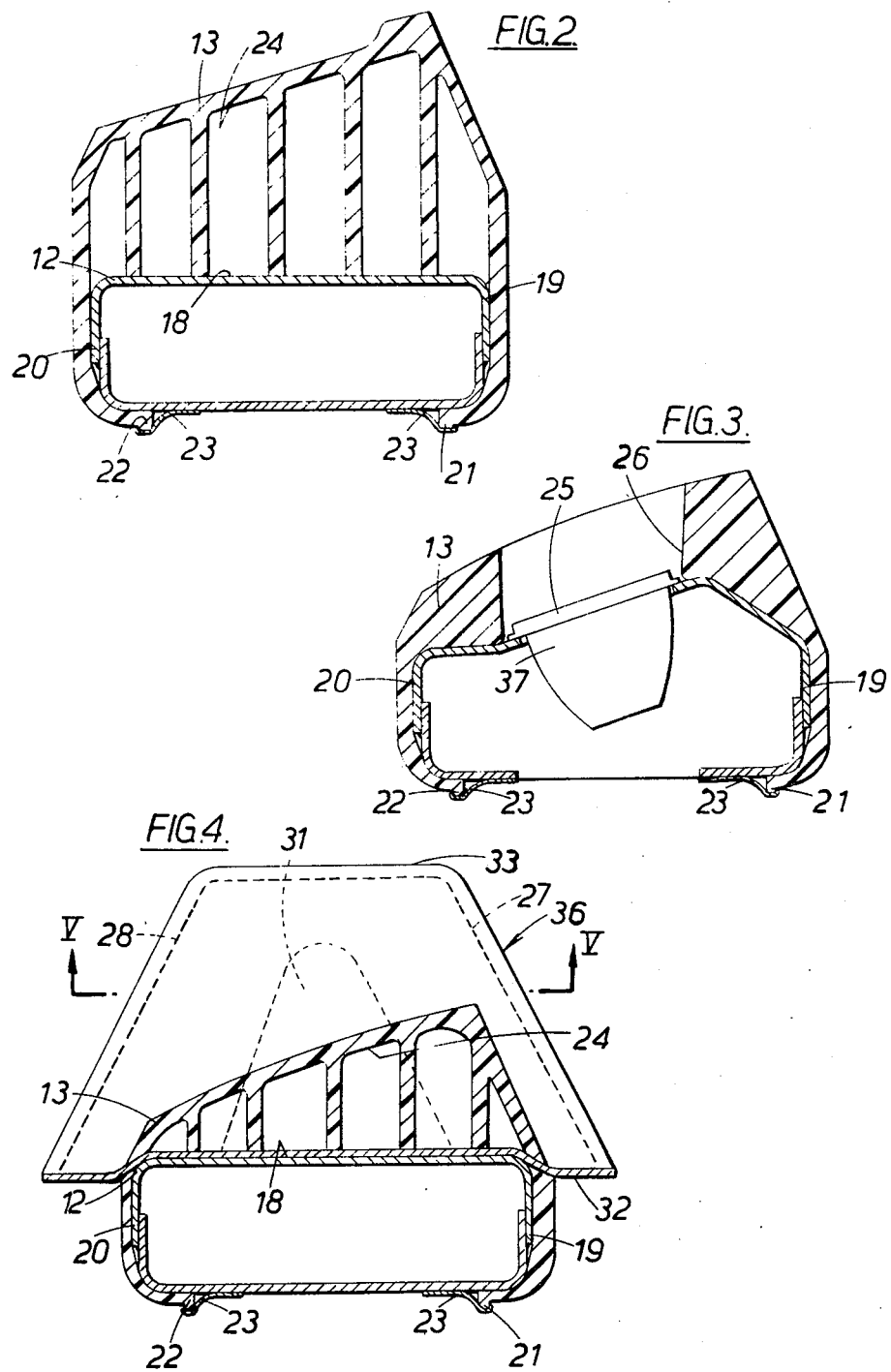

ENERGY ABSORBING BUMPERS FOR VEHICLES

This invention relates to energy absorbing bumpers for vehicles.

According to a first aspect of the present invention an energy absorbing bumper assembly comprises an elongated elastomeric member secured to a structural member, the elastomeric member having an inner generally concave surface from which integral resiliently deformable webs extend into contact with, or at least closely adjacent to, the structural member to provide a deformable cellular structure.

In a preferred form of the first aspect of the present invention the bumper assembly includes at least one energy absorbing over-or under-rider assembly with a further elastomeric member comprising limbs in the form of a truncated V with the separated ends of the limbs secured to a structural member and the joined ends or apex of the limbs being adapted to receive the impact whose energy is to be absorbed; the further elastomeric member having integral resiliently deformable side walls which extend into contact with, or closely adjacent to, the structural member to enclose the free volume between the limbs of the truncated V.

A bumper assembly embodying the invention will now be described, by way solely of example, with reference to the accompanying drawings of which:

FIG. 1 is a sectional plan view of half a vehicle bumper;

FIGS. 2, 3 and 4 are sections on, respectively, sections II—II, III—III and IV—IV of FIG. 1; and FIG. 5 is a section on section V—V of FIG. 4.

The figures show the left hand half of a front end bumper for a saloon car. The bumper is symmetrical about the center line axis C of the car.

The bumper is made up of an assembly 11 comprising a box section 12 of mild steel on the front side of which is mounted an elastomeric member 13. The member 13 is mounted so as to envelope the box section 12 on its front face 18, upper side 19 and lower side 20. Flanges 21, 22 on the edges of member 13 are retained on the rear face of box section 12 by clamps 23.

The member 13 has an inner generally concave surface 24 from which integral webs extend into contact with front face 18 of the box section 12.

Both box section 12 and member 13 are varied in cross-section as required. FIG. 2 shows a typical section in the vicinity of the center line axis C. FIG. 3 shows the cross section allowing for the mounting of side light 37 within the box section 18. A removable transparent cover 25 is secured to the box section by screws so as to allow access to the side light 37. A gap 26 is provided in the member 13 in the vicinity of the cover 25.

FIG. 4 shows a cross section of member 13 of reduced depth by comparison with the section shown in FIG. 2. FIGS. 4 and 5 also show an overrider 36 of truncated V form with limbs 27, 28 which enclose, together with side walls or membranes 29, 30 a free volume 31. The separated ends of limbs 27, 28 are secured by adhesive to a base plate 32 bolted to the box section 12. The profiles of the limbs 27, 28 are adapted to provide the desired energy absorption on impact of front face 33 of overrider 36 with an obstruction.

The embodiment described makes use of a box section 12 of mild steel. However any convenient shape of section to provide the necessary controlled stiffness can be used. This allows a degree of choice of profile for the bumper typically for styling purposes.

The elastomeric member is of self skimming urethane foam.

In operation, when the bumper strikes an obstacle, the two arms of the overrider are compressed, and if placed under sufficient pressure, their separated ends spread. The impact is then taken by the member 13, so that the webs are compressed or distorted. It will be appreciated that since both the overrider and the member 13 cover completely enclosed spaces, a substantial amount of energy is absorbed by compression of the air within those spaces.

We claim:

1. An energy absorbing bumper assembly comprising:
   a. an elongated elastomeric member secured to an elongated structural member, the elastomeric member having an inner gradually concave surface from which integral resiliently deformable webs extend to points at least closely adjacent to the structural member in a direction transverse to said structural member to provide a deformable cellular structure; and
   b. at least one bumper rider assembly with a further elastomeric member having limbs in the form of a truncated V with the separated ends of the limbs secured to the structural member and the joined ends or apex of the limbs being adapted to receive the impact whose energy is to be absorbed; the further elastomeric member having integral resiliently deformable side walls which extend to points at least closely adjacent to, the structural member to enclose the free volume between the limbs of the truncated V.

2. An energy absorbing bumper assembly as claimed in claim 1 wherein the elastomeric member is of self-skimming polyurethane foam.

3. An energy absorbing bumper assembly as claimed in claim 1 wherein the further elastomeric member is of self-skimming polyurethane foam.

* * * * *